Patented June 10, 1930

1,762,194

UNITED STATES PATENT OFFICE

WILLIAM BEACH PRATT, OF WELLESLEY, MASSACHUSETTS, ASSIGNOR, BY MESNE ASSIGNMENTS, TO DISPERSIONS PROCESS, INC., OF DOVER, DELAWARE, A CORPORATION OF DELAWARE

COMPOSITION OF MATTER

No Drawing. Application filed May 18, 1925. Serial No. 31,238.

This invention relates to a composition of matter comprising a suspension of rubber in bodies of the nature of oils, waxes, gums or bitumens, in which the rubber is normally immiscible, and also to a process of producing the same.

It is known, of course, that rubber (either crude or reclaimed rubber) may be "dissolved" in such organic solvents as benzol, naphtha, gasolene and other so-called rubber solvents, and it is also known that it is possible to stir crude or reclaimed rubber into or mix it with such substances as engine oils, petrolatum, rosin, the so-called mineral rubbers and the like, to form what appear to be homogeneous mixtures when they are cold; but, so far as my knowledge goes, it has been considered impossible to disperse crude or reclaimed rubber in a hot oil, wax, gum or bitumen in such manner that when the mixture is cooled the rubber will remain uniformly dispersed throughout the mixture, especially if the mixture be again heated. For example, if a resin, wax, bitumen or oil or a mixture thereof is heated to a temperature of, say, 120° C. and it be attempted to "dissolve" the rubber therein, the rubber in spite of mechanical agitation will finally separate and float as a mass on the surface thereof and will not form a homogeneous mixture therewith. In fact, if the resin, oil or bitumen should be mixed with the rubber at a temperature at which would form a thick plastic mass and the rubber were kneaded thereinto, nevertheless, upon heating the mass to a temperature of about 120° C., the rubber separates and rises to the top of the mass, thereby preventing a perfect mixture or dispersion.

It is also a recognized fact that rubber will "depolymerize" at a temperature of about 160° C., and as the temperature is raised the rubber ultimately disintegrates, and, after a temperature is reached in which such disintegration is complete, the rubber can be frequently distilled from any higher-boiling-point oil with which it is intermixed.

I have discovered that it is possible to effect the dispersion of crude or reclaimed rubber in an oil, wax, gum, resin or bitumen or mixtures thereof at any temperature from, say, 100° C. to a temperature of, say, 150° C. at which the "depolymerization" of the rubber would begin.

In a previous application (e. g., Serial No. 662,556, filed Sept. 13, 1923) I have described a method by which crude rubber may be dispersed in an aqueous medium, by separating the globules of rubber and supplying each globule with a protective colloidal coating so that the resultant dispersion may be diluted to any desirable extent by the addition of water thereto, and so that by the elimination of the water the rubber may be restored to a coagulated condition and vulcanized if desired.

I have further discovered that, by separating and coating the globules of rubber with a protective colloidal coating, it is possible to disperse the rubber throughout a hot mass of substances with which the rubber is immiscible or which are not so-called "solvents" of rubber, in such manner as to provide a stable, physically-homogeneous suspension or dispersion.

I have further discovered that by the addition of sulphur to such a suspension or dispersion, it is possible not only to effect the vulcanization of the dispersed rubber, but also to obtain many different kinds of products having different physical characteristics of viscosity, hardness, toughness, melting point lag, etc., and also to secure an effective control of these several characteristics.

In effecting the dispersion of the rubber in a non-solvent substance, the operation may be performed in two steps. First, the rubber is conditioned for dispersion by the employment of a suitable water-carrying colloidal dispersing agent; and, after the water has been removed, the rubber mass may by a second step be dispersed in the heated oil, wax, gum, resin or bitumen or other nonsolvent at temperatures below 160° C., without causing the "depolymerization" of the rubber and a stable "dispersion" produced. While various colloidal dispersing or stabilizing agents may be utilized, such as glue, colloidal clay, albumen or the like, I prefer ordinarily to employ neutral casein. For example, in preparing the rubber for dispersion in the organic non-solvents of rubber, one may proceed as follows:—100 pounds of crude or reclaimed rubber are first milled on the usual compounding rolls in accordance with ordinary factory practice to produce a workable rubber mass. There is now worked on incorporated into the plastic rubber mass, either by the compounding rolls or by a two-blade mixer of the general character of a dough mixer or a "Werner & Pfleiderer" mixer, about 15 pounds of neutral casein which has been previously wetted and swollen with an equal weight of water for at least two hours. This wet pasty mass of casein is thoroughly kneaded into the rubber until the colloidal agent has penetrated the interglobular spaces of the rubber mass and has formed a protective film or coating about the globules of the rubber. On a compounding mill this ordinarily takes from 15 to 20 minutes, whereas in a two-blade mixer it may require from 30 to 45 minutes. During the compounding or kneading process the heat generated thereby is ordinarily sufficient to cause the evaporation of a great portion of the water carried into the mass by the casein, although the rolls or the mixer may be heated if desired. The mass may now be further heated sufficiently to dry out most of the water, although it is not necessary to remove the last traces of moisture as they are evaporated during the next step of the process.

The rubber casein mass, which comprises the rubber globules with their added protective coatings or films of colloidal casein, is now introduced into the non-solvent substance in which it is desired to disperse the rubber. For example, I heat to a temperature of, say, 120° C., about 60 pounds of rosin, 20 pounds of Montan wax, 10 pounds of "mineral rubber" and 10 pounds of copal gum until the components are molten, and I stir and agitate the mass so as to secure a substantially homogeneous mixture of the various components. The mass is not only physically homogeneous but is fairly viscous at the temperature stated, and when the mixing operation has been completed, I now add the previously prepared rubber-casein mass and stir or knead it thoroughly into the previous mixture. During the stirring operation, the rubber mass slowly disintegrates substantially into its constituent globules (each protected by a colloidal coating) and uniformly disperses throughout the mass, and the rubber so dispersed is maintained in a uniformly dispersed condition throughout the mass regardless of an increase or diminution in the temperature thereof, provided that the temperature is not raised materially above 160° C. or to a point which would cause a "depolymerization" of the rubber. The resulting product on being cooled has a melting point which is practically the same as the melting point of the mixture without the rubber, but it has adhesive and cohesive properties greatly superior to or in excess of those of the mixture without the rubber. It may again be heated to a molten condition without the separation of the rubber therefrom.

Of course it will be understood that the foregoing example is merely by way of illustration and that the invention is not limited either to the specific non-solvent substances which I have referred to, or to the particular colloidal dispersing agent which I have described, to the proportions which I have indicated, or to the sequence of steps hereinbefore stated. For example, the whole process may be carried out in a steam-jacketed two-blade mixer of the Werner & Pfleiderer type, in which the casein or other water-carrying colloid is worked and kneaded into the rubber, for after this has been accomplished there may be added to the mixer any suitable gums, resins, waxes or bitumens or combinations thereof into which the rubber is to be dispersed. In such case, it is desirable that the mixer shall be steam-jacketed, as stated, so that it may be heated or chilled to the desired temperature for the purpose of reducing the rubber non-solvents to a viscous workable mass.

It is possible, by selecting various rubber non-solvents in different proportions, to produce a normally solid or viscous product having any desired melting point below 160° C., since it seems to be the fact that the addition of the rubber to and its dispersion through the mass does not appreciably change the melting point thereof.

Another important feature of the present invention is the vulcanization of the dispersed rubber. This is accomplished by adding sulphur in the desirable quantity to the dispersion and heating the mixture to a temperature at which the cure is effected,—taking into account the necessary time element. After the dispersion of the colloidal protected rubber in the organic non-solvent (e. g., the mixture of rosin, Montan wax, "mineral rubber" and copal) from 0.25% to 3.0% of sulphur, based on the weight of the rubber, is stirred into the dispersion to form a homogeneous mixture, and the latter is heated from a temperature of, say, 120° C. to 160° C. At these temperatures the rubber vulcanizes, the time required depending upon the temperature and to some extent upon the quantity of sulphur. With the proportions of sulphur herein stated the rubber is elastic, but when elasticity is not requisite, the proportionate quantity of sulphur may be increased to any desired amount.

It seems to be the fact that a selectivity occurs, and that when only small quantities of sulphur are employed, there is a selective action of the sulphur and the rubber, and even when the non-solvent comprises a gum, wax, bitumen or oil which is normally hardened by or reacts with sulphur, the sulphur appears to react only with the dispersed rubber of the mass. When an excess of sulphur is added, however, it has the effect of hardening or reacting with some of the other components of the non-solvent in which the rubber has been dispersed.

It further seems to be the fact that, by first effecting a homogeneous admixture of a colloidal dispersing agent throughout the rubber mass so as to cause the separation of the rubber globules and their protection by enveloping colloidal films, it is possible to disperse the rubber globules throughout a mass of rubber non-solvents such as oils, gums, waxes, resins or bitumens, so as to produce a final product having any desirable adhesive and cohesive properties. For example, I have utilized such rubber-casein product as the basis of synthetic gutta-percha and balata, and have found use for such products in the production of substances having almost identically the same characteristics as gutta-percha, balata and chicle. By dispersing the colloidally protected rubber throughout a mass of any of the organic rubber non-solvents which are suitable for the purpose, products similar to glue may be produced which are waterproof and which have adhesive and cohesive properties much superior to those of glue, and which can be applied when the mass is rendered soft or plastic by heat, either by a spreading or a dipping operation.

Remarkable results are also achieved by curing the dispersed rubber with sulphur. In fact, according to the selection and proportion of the components of the non-solvent, the proportion of the dispersed casein-protected rubber, and the quantity of sulphur employed, an accurate control is effected in producing many different products having any desired physical characteristics. For example, while the dispersion of the rubber in the non-solvent does not materially change the melting point of the non-solvent, by adding various quantities of sulphur the melting point may be increased, and it is possible to control the lag, i. e., the temperature range between the softening and the melting points of the mass.

A thermoplastic mass produced by the dispersion of rubber in a rubber non-solvent, either before or after the treatment with sulphur, may be itself dispersed in water by introducing a water-carrying colloid into the mass by a kneading operation, and then adding and kneading water thereinto until a change of phase occurs and the water becomes the continuous phase of the dispersion.

The thermoplastic mass, comprising colloidally protected rubber particles or globules dispersed throughout an organic non-solvent of rubber, such as oils, waxes, bitumens, resins and the like, with or without sulphur, has a wide application in the art. It may be used as an adhesive for saturating or treating fibrous materials, for waterproofing or for insulating purposes, etc.

For the lack of a better comprehensive and generic term, I have employed in the appended claims the phrase "non-aqueous substances which are non-solvents of rubber" as referring to and including those substances which I have hereinbefore indicated as being of such character that they may be rendered sufficiently liquid or plastic by heating or chilling as to permit the dispersion of rubber therein, and thus enable one to produce a stable non-aqueous dispersion in which the rubber constitutes the disperse phase, and the non-aqueous non-solvent substance the continuous phase. As previously stated, this non-aqueous dispersion may be dispersed in water by the same process in which the rubber was initially dispersed in water.

By selection of suitable rubber non-solvents, the final product, in which the rubber is dispersed, may be normally adhesive when cold, or may be non-tacky when cold and highly adhesive when warmed.

A product produced in accordance with the specific example herein given is tough or non-friable, rigid and stiff when cold, but is thermoplastic, and when heated may be either molded or may be spread upon a fabric, or a fibrous material may be saturated therewith, or the product may be used as a glue or adhesive material. When sufficiently warmed, it may be drawn out into a continuous filament of a yard or more in length, and almost as fine as a spider's web. It has a tackiness and adhesiveness much greater than the mixture of gums and resins before the rubber is incorporated therein. While I prefer to employ crude rubber in most cases in producing my new composition of matter comprising a substance, such as a gum, oil, wax, resin or bitumen or a mixture or some of all of them, which is a non-solvent of non-polymerized rubber, and the colloidally coated rubber particles, yet in certain instances I employ "reclaimed" rubber or "rubber substitutes" so-called in lieu of crude rubber with excellent results.

Having thus explained the nature of my invention or discovery, the nature and certain properties of the composition of matter and a process of producing the same, all however without attempting to set forth all of the various products or compositions of matter embodying my invention or all of the modes or their use or all of the various ways by which the process may be practiced, what I claim is:—

1. A process of dispersing rubber in non-aqueous substances which are non-solvents of rubber, which comprises first incorporating a colloid in a rubber mass and then mixing the rubber-colloid mixture with and dispersing it as the disperse phase in the said non-solvent substance at a temperature ranging from about 120° C. to about 160° C. but insufficient to "depolymerize" the rubber.

2. A process of dispersing rubber in non-aqueous substances which are non-solvents of rubber, which comprises first incorporating a colloid in a rubber mass and then mixing the rubber-colloid mixture with and dispersing it as the disperse phase in the said non-solvent substance at a temperature ranging from about 120° C. to about 160° C. but insufficient to "depolymerize" the rubber, and when the rubber has been dispersed mixing sulphur with the mass and effecting the vulcanization of the dispersed rubber.

3. A process of dispersing rubber in non-aqueous substances which are non-solvents of rubber, which comprises first plasticizing a rubber mass and coating its globules with an additional colloidal coating, and then intermixing the rubber mass with said non-solvent substance in liquid state until the rubber mass disintegrates and is dispersed uniformly throughout said substance as the disperse phase of the mass.

4. A process of dispersing rubber in non-aqueous substances which are non-solvents of rubber, which comprises first plasticizing a rubber mass and coating its globules with a colloidal coating, and then intermixing the rubber mass with said non-solvent substance in liquid state until the rubber mass disintegrates and is dispersed uniformly in colloidally-protected globules throughout said substance, and adding and stirring sulphur into the mass.

5. A process of dispersing rubber in non-aqueous substances which are non-solvents of rubber, which comprises first incorporating a water-carrying colloid and water in a rubber mass, and then mixing the resultant product in a molten mass of said non-solvent substance until the rubber is dispersed uniformly therein.

6. A process of dispersing rubber in non-aqueous substances which are non-solvents of rubber, which comprises first incorporating neutral casein and water in the rubber mass, and then mixing the resulting product with a liquid mass of said non-solvent substance, heated to a temperature below that which causes "dopolymerization".

7. A process of dispersing rubber in non-aqueous substances which are non-solvents of rubber, which comprises first incorporating neutral casein and water in the rubber mass, mixing the resulting product with a heated liquid mass of said non-solvent substance, and then vulcanizing the dispersed rubber.

8. A process of dispersing rubber in non-aqueous substances which are non-solvents of rubber, which comprises first incorporating neutral casein and water in the rubber mass, removing the water, and mixing the rubber-casein product with and dispersing it in a heated liquid mass of said non-solvent substance.

9. A process of dispersing rubber in non-aqueous substances which are non-solvents of rubber, which comprises first incorporating neutral casein and water in the rubber mass, removing the water, and mixing the rubber-casein product with a heated mass of said non-solvent substance at a temperature ranging from 120° C. to 160° C.

10. A process of dispersing rubber in non-aqueous substances which are non-solvents of rubber, which comprises first incorporating neutral casein and water in the rubber mass and dispersing the rubber in casein-protected particles in the water, removing the water, and mixing the rubber-casein product with a heated mass of said non-solvent substance at a temperature ranging from 120° C. to 160° C., and adding sulphur in sufficient amount to vulcanize the dispersed rubber.

11. A composition of matter comprising a non-aqueous substance, which is a non-solvent of unvulcanized rubber, and rubber together with a colloidal agent uniformly dispersed therein, said non-aqueous substance constituting the continuous phase of the composition and amounting to greater than 20% by weight of the composition.

12. A composition of matter comprising a non-aqueous substance, which is a non-solvent of rubber, having dispersed therein colloidally-protected non-depolymerized rubber particles, said non-aqueous substance constituting the continuous phase of the composition and amounting to greater than 20% by weight of the composition.

13. A composition of matter comprising a non-aqueous substance, which is a non-solvent of rubber, having dispersed therein crude rubber globules, additionally coated with a colloid, and sulphur, said non-aqueous substance constituting the continuous phase of the composition and amounting to greater than 20% by weight of the composition.

14. A composition of matter comprising a non-aqueous substance, which is a non-solvent of rubber, crude rubber, and a colloid, the rubber globules being protected by the colloid and being non-separably dispersed in and vulcanized in and throughout such substance, said non-aqueous substance constituting the continuous phase of the composition and amounting to greater than 20% by weight of the composition.

15. A composition of matter which is solid when cold, comprising a non-aqueous substance, which is a non-solvent of rubber, having rubber and casein incorporated and uniformly dispersed therein as the disperse phase, said non-aqueous substance constituting the continuous phase of the composition and amounting to greater than 20% by weight of the composition.

16. A thermoplastic composition of matter comprising minute rubber particles protected by a colloidal agent and dispersed in a thermoplastic body as the continuous phase and amounting to greater than 20% by weight of the composition.

In testimony whereof I have affixed my signature.

WILLIAM BEACH PRATT.